US010157295B2

(12) United States Patent
Barinov et al.

(10) Patent No.: US 10,157,295 B2
(45) Date of Patent: Dec. 18, 2018

(54) SYSTEM AND METHOD FOR FILE AUTHENTICITY CERTIFICATION USING BLOCKCHAIN NETWORK

(71) Applicant: Acronis International GmbH, Schaffhausen (CH)

(72) Inventors: Igor Barinov, San Mateo, CA (US); Victor Lysenko, Moscow (RU); Serguei Beloussov, Costa del Sol (SG); Mark Shmulevich, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 15/726,605

(22) Filed: Oct. 6, 2017

(65) Prior Publication Data

US 2018/0101701 A1    Apr. 12, 2018

Related U.S. Application Data

(60) Provisional application No. 62/405,408, filed on Oct. 7, 2016.

(51) Int. Cl.
    H04L 29/06      (2006.01)
    G06F 21/64      (2013.01)
    H04L 9/32       (2006.01)

(52) U.S. Cl.
    CPC ............ *G06F 21/64* (2013.01); *H04L 9/3236* (2013.01); *H04L 9/3265* (2013.01); *H04L 63/12* (2013.01)

(58) Field of Classification Search
    CPC ..... H04L 9/3236; H04L 9/3265; H04L 63/12; G06F 21/64; G06F 17/30097
    USPC ......................................................... 726/10
    See application file for complete search history.

(56) References Cited

U.S. PATENT DOCUMENTS

2016/0292458 A1*  10/2016  Serret-Avila ............ G06F 21/64
2017/0075938 A1*   3/2017  Black ..................... G06F 21/602

* cited by examiner

*Primary Examiner* — Yogesh Paliwal
(74) *Attorney, Agent, or Firm* — Arent Fox LLP

(57) ABSTRACT

A system and method for authenticating data files using a block chain network. An exemplary method includes identifying data files in electronic data storage, computing hash values for files, adding pairs of the hash values and computing hash values for each resulting pair, continuing this process to a root level of a hash tree, and sending the root hash to a blockchain network in which one or more nodes in the blockchain network adds the hash value as one or more blocks in a blockchain.

17 Claims, 8 Drawing Sheets

SYSTEM AND METHOD FOR FILE AUTHENTICITY CERTIFICATION USING BLOCKCHAIN NETWORK

CROSS REFERENCE TO RELATED APPLICATIONS

This application claims priority to U.S. Provisional Patent Application No. 62/405,408, filed Oct. 7, 2016, the entire contents of which are incorporated by reference in its entirety.

FIELD OF TECHNOLOGY

The present disclosure generally relates to data storage, and, more specifically to a method and system for file authenticity certification using blockchain technology.

BACKGROUND

Continuing advances in storage technology provide significant amounts of digital data to be stored cheaply and efficiently. One existing technology that is capable of storing large volumes of digital data is blockchain technology. In general, blockchain technology is most widely known as the technology behind the popular cryptocurrency, Bitcoin. A blockchain creates a history of data deposits, messages, or transactions in a series of blocks where each block contains a mathematical summary, called a hash, of the previous block. In turn, this process creates a chain where any changes made to a block will change that block's hash, which must be recomputed and stored in the next block. This changes the hash of the next block, which must also be recomputed and so on until the end of the chain.

Verification of authenticity of files stored in a database using hashes of the files in a blockchain network has also been widely used. FIG. 1 illustrates a block diagram of an example of an existing system that stores hashes of files in a blockchain network. As shown, a plurality of files 12a-12e are collectively stored in a database 10 as a set of files 12. Hashes for each of the files 12a-12e can be created and transmitted to blockchain network 20 for storage. As further shown, the blockchain network 20 can be a distributed network formed from a plurality of nodes or computers 22a-22e, for example. The blockchain network 20 maintains a continuously-growing list of file hashes that are hardened against tampering and revision and is composed of data structure blocks that exclusively hold the hashes of the files 12 received from the data storage 10. Typically, every node (e.g., computers 22a-22e) in the decentralized system has a copy of the growing blockchain. This design avoids the need to have a centralized database managed by a trusted third party. Moreover, each of the nodes 22a-22e can validate the data, add hash values them to their copy of the blockchain and then broadcast these additions to other nodes in accordance with existing blockchain methodologies.

While blockchain technology offers many significant advantages (e.g., improved data security) for distributed data storage system when compared with older storage systems, blockchain storage techniques can still be unacceptable in certain situations. For example, when the amount of data blocks, files, and the like, received by the database 10 is too large (e.g., hundreds or even thousands of records per second) the blockchain cannot process all of these transactions since its capacity is limited to a certain amount of records in a given time period. Moreover, transactions stored using a blockchain network (e.g., blockchain network 20) can be quite expensive. For example, each record may costs a few cents for storage in the network 20, which can be unacceptable when the number of records is in the thousands or millions.

SUMMARY

In view of the foregoing problems and existing technologies, it is desired to provide a system and method for file authenticity certification using blockchain technology. In particular, using the method and system disclosed herein, existing blockchain networks can be used for the storing of information about files as hash values of the files. Specifically, the system and method can compute a tree of hash values of the files in Merkle tree format that allows storing information about hashes of a large number of files in the form of a root-level hash. The system and method disclosed herein overcomes the limitations inherent in blockchain network technology, including low bandwidth and high transaction costs.

Thus, according to one exemplary aspect, a method is provided for authenticating data files using a block chain network. In this aspect, the method includes identifying a plurality of data files in electronic data storage; creating, by a computer processor, respective first hash values for each of the plurality of files; adding, by the computer processor, a first plurality of the first hash values to create a first hash sum of the first plurality of the first hash values; creating, by the computer processor, a respective second hash value for the first hash sum; determining, by the computer processor, if there are any additional hash values corresponding to one file or a second plurality of the files that is not included in the first plurality of hash values; and if the computer processor determines there are no additional hash values, transmitting the second hash value to the blockchain network in which at least one node in the blockchain network adds the second hash value as one or more blocks in a blockchain.

According to another aspect of the method, if the computer processor determines that there is more than one second hash value, the method further includes adding, by the computer processor, at least one plurality of the second hash values to create an additional hash sum of each of the at least one plurality of the second hash values; creating, by the computer processor, respective third hash values for each of the additional hash sums; and if there is only one third hash value, transmitting the third hash value to the blockchain network in which at least one node in the blockchain network adds the third hash value as one or more blocks in a blockchain.

According to another aspect, the method further includes continuously adding the hash sums and creating new hash values for the hash sums until a root hash value is computed; and transmitting the root value to the blockchain network in which at least one node in the blockchain network adds the root hash value as one or more blocks in a blockchain.

According to another aspect, the method further includes identifying a plurality of created hash values required for a certificate of authenticity of at least one of the plurality of identified data files.

According to another aspect, the method further includes comparing the plurality of created hash values with the root hash value to authenticate the at least one identified data file.

According to another aspect, the method further includes deleting created hash values except for the identified plurality of created hash values required for the certificate of authenticity for the at least one identified data file.

According to another aspect, the at least one plurality of first hash values is a pair of the first hash values.

According to one aspect, a system is provided for authenticating data files using a block chain network. In this aspect, the system includes electronic data storage that stores the data files; and a computer processor configured to: identify a plurality of data files in electronic data storage; create respective first hash values for each of the plurality of files; add a first plurality of the first hash values to create a first hash sum of the first plurality of the first hash values; create a respective second hash value for the first hash sum; determine if there are any additional hash values corresponding to one file or a second plurality of the files that is not included in the first plurality of hash values; and if there are no additional hash values, transmit the second hash value to the blockchain network in which at least one node in the blockchain network adds the second hash value as one or more blocks in a blockchain.

According to another aspect, a non-transitory computer readable medium storing computer executable instructions is provided for authenticating data files using a block chain network. In this aspect, instructions are included for identifying a plurality of data files in electronic data storage; creating respective first hash values for each of the plurality of files; adding a first plurality of the first hash values to create a first hash sum of the first plurality of the first hash values; creating a respective second hash value for the first hash sum; determining if there are any additional hash values corresponding to one file or a second plurality of the files that is not included in the first plurality of hash values; and if there are no additional hash values, transmitting the second hash value to the blockchain network in which at least one node in the blockchain network adds the second hash value as one or more blocks in a blockchain.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
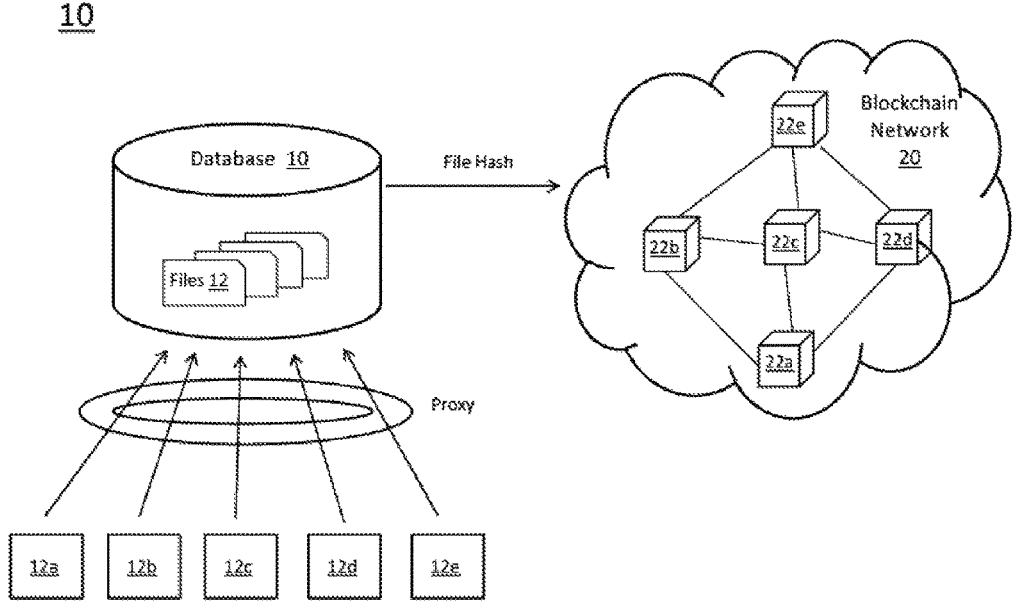
FIG. 1 illustrates a block diagram of an example of an existing system that stores hashes of files in a blockchain network.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

The present disclosure is directed to a system and method for file authenticity certification using blockchain technology.

Figure 2:
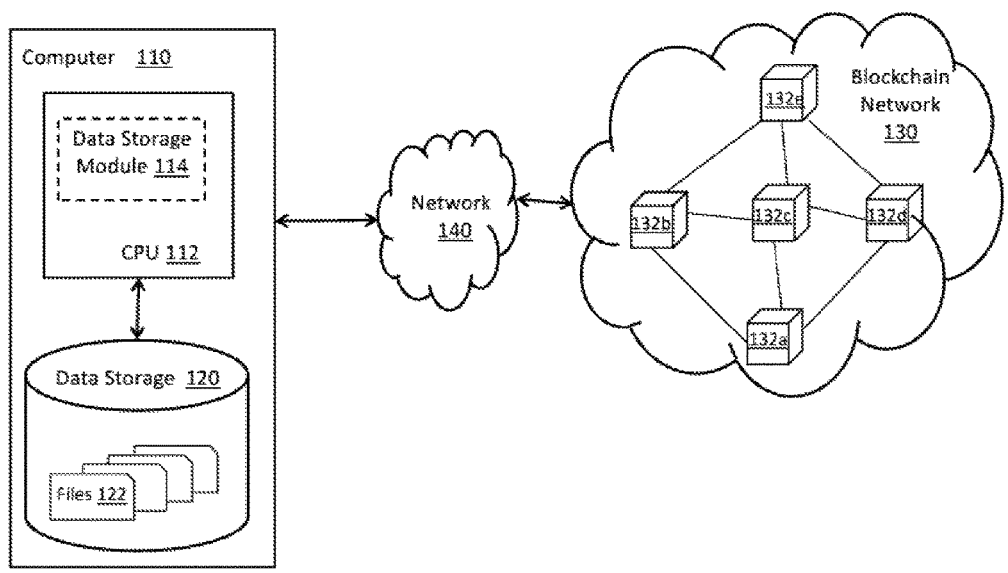
FIG. 2 illustrates a block diagram of a system for file authenticity certification using blockchain technology according to an exemplary aspect.

FIG. 2 illustrates a block diagram of a system for file authenticity certification using blockchain technology according to an exemplary aspect. As shown, the system 100 generally includes a computer 110, data storage 120, a blockchain network 130 and network 140. The details of the computer 110 will be discussed below with respect to FIG. 3, but generally the computer 110 is configured to manage the data storage process using CPU 112, which includes storing files 122 in data storage 120, generating hash values of the files 122 and creating a hash tree or Merkle tree, and transmitting the hash value(s) to the blockchain network 130 for storage thereon. According to the exemplary aspect, the computer 110 may be any type of computing device, such as a laptop, a desktop, a tablet, a mobile phone and the like. The specific hardware details of the exemplary computer 110 will be described below with respect to FIG. 8. It should be appreciated that while a Merkle tree is described for the exemplary aspect, other types of hash trees can be used for the exemplary system and method. For example, a Partricia Merkle tree can be used for such kinds of certificates in one aspect.

Furthermore, according to the exemplary aspect, the data storage 120 can generally include hardware and software components configured to manage various storage resources within the computing environment. According to the exemplary embodiment, data storage 120 may be a storage device of computer 110. For example, the data storage 120 can include one or more data storage devices (e.g., hard disk drives, optical drives, magnetic tape drives and/or the like) and storage management software that provides an interface to the one or more data storage devices. Alternatively, data storage 120 can be a storage device separately and communicatively coupled to computer 110, for example, by network 140. According to an exemplary aspect, the data storage 120 can be a data cloud storage service that facilitates temporary and/or permanent storage of computer data, including data files 122 of computer 110. The computer data of data files 122 may be any type of electronic, digital data generated and/or stored by a computer. For example, the computer data can represent text data, executable program code, audio, video or image data, or any other type of digital data. As will be discussed in detail below with respect to the exemplary algorithms, the computer 110, and more particularly data storage module 114, is configured to calculate hash values of files stored thereon as part of a hash tree and transmit the root hash values to blockchain network 130.

According to an exemplary aspect, the blockchain network 130 can be an existing (public or private) distributed network formed from a plurality of nodes or computers 132a-132e, for example. According to the exemplary aspect, the blockchain network 130 maintains a continuously-growing list of data records hardened against tampering and revision and is composed of data structure blocks that exclusively hold the data received from the computer 110. In particular, after the data storage module 114 of computer 110 creates hash values of the data files 122 (discussed in detail below) and transmits such hash values to the blockchain network 130, the transaction in the blockchain records blocks and confirm when and in what sequence the data transactions enter and are logged in the existing blockchain. Preferably, every node (e.g., computers 132a-132e) in the decentralized system has a copy of the growing blockchain. This design avoids the need to have a centralized database managed by a trusted third party. Moreover, each of the nodes 132a-132e can validate the data, add hash values to their copy of the blockchain and then broadcast these additions to other nodes in accordance with existing blockchain methodologies.

According to the exemplary aspect, the computer 110, the data storage 120 (optionally, if separate from the computer 110) and the blockchain network 130 are configured to transmit data across network 140. The applicable network 140 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network 140 may employ various well-known protocols to communicate information amongst the network resources. In one aspect, the network 140 can be part of the Internet or intranet using various communications infrastructure such as Ethernet, WiFi and the like.

Figure 3:
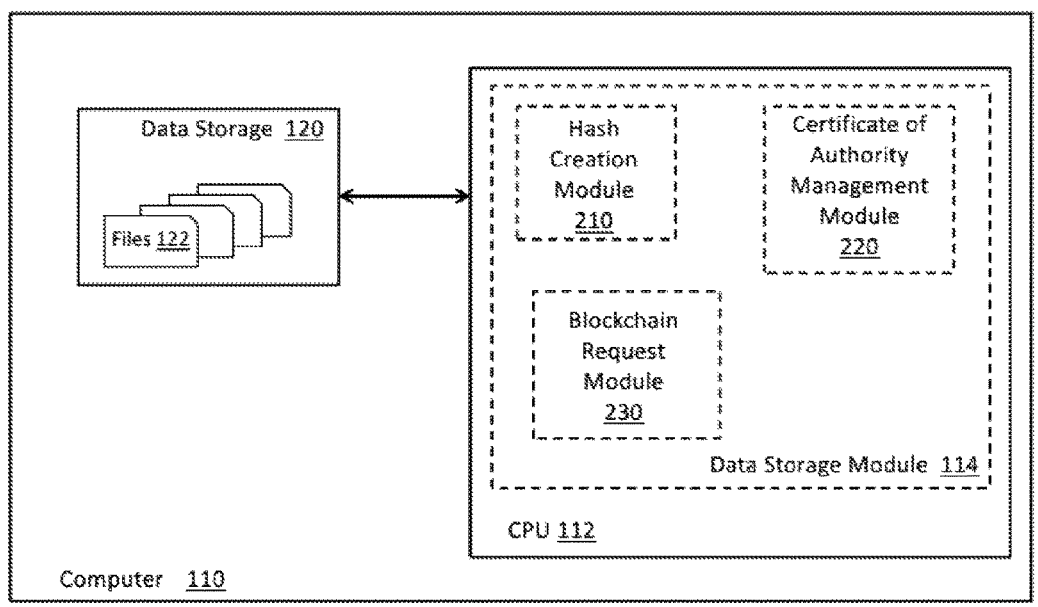
FIG. 3 illustrates a block diagram of the computer system shown in FIG. 2 for file authenticity certification using blockchain technology according to an exemplary aspect.

FIG. 3 illustrates a block diagram of the computer 110 system shown in FIG. 2 for file authenticity certification using blockchain technology according to an exemplary aspect. As shown, the computer 110 includes a central processing unit ("CPU") 112 provided to, among other things, execute the data storage module 114, which is comprised of three sub-modules, including hash creation module 210, certificate of authority management module 220 and blockchain request module 230. In this aspect, the data storage module 114 and each of the sub-modules include software code (e.g., processor executable instructions) in memory, which may be configured to execute/facilitate the storing and managing of data files 122 according to an exemplary embodiment, as will be discussed in more detail below.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

For purposes of this disclosure below with respect to the exemplary algorithms, the disclosure generally refers to the computer 110 and/or one of the specific modules and sub-modules to perform the various steps of the algorithm.

As further shown in FIG. 3, the computer 110 includes data storage 120 (i.e., electronic memory) that stores the electronic data, for example, data files 122 as discussed above. In addition, data storage 120 is provided to store the hash value for each of the files (and combination of files, including the hash tree) created according to the exemplary aspects. The data storage 120 can be a computer-readable medium includes data storage, and, by way of example, and not limitation, can comprise RAM, ROM, EEPROM, CD-ROM, Flash memory or other types of electric, magnetic, or optical storage medium, or any other medium.

According to the exemplary aspect, CPU 112 is configured to execute the data storage module 114 and related sub-modules 210, 220 and 230. In particular, data storage module 114 is configured to identify/obtain a plurality of files 122 from data storage 120 for verification of authenticity. Once these files 122 are identified, hash creation module 210 is configured to generate hash values for each of the files 122. The hash values of the files 122 can also be stored in data storage 120. Next, the hash creation module 210 further groups the created hash values into sets of two or more hash values (e.g., pairs of hash values are described according to the exemplary aspect) and adds the hash values for each grouping. It should be appreciates that the hash values are not necessarily arranged in pairs only, however, most often the binary trees are used, so for the such binary of trees the grouping of hash values is organized by pairs according to the exemplary aspect. Then, for each sum of hash values, the hash creation module 210 creates a hash value for that sum. The hash creation module 210 is configured to continue this process until a root hash value for the group of files 122 is created, effectively creating a hash tree that can be stored in data storage 120.

Furthermore, blockchain request module 220 is configured to transmit the root hash value for the group of files 122 to the blockchain network 130 (refer to FIG. 2) to be stored therein, as described above. As a result of this process, system 100, and, more particularly, computer 110, is configured to obtain a confirmation of authenticity for a plurality of files while limiting the transaction(s) to a single transaction in the blockchain network 230.

According to the exemplary aspect, the authenticity of the data files 122 stored in the database (i.e., data storage 120) can be checked using the root-level hash generated by hash creation module 210 and stored in blockchain network 130. In order to check the authenticity of a file, computer 110, and, more particularly, certificate of authority management module 230, is configured to generate a certificate of authority for a target file. Although a certificate of authority may be generated using the whole hash tree in its entirety, it is preferable that the certificate of authority management module 230 only stores information relating to a chain of hashes for the file in order to reduce the size of such a certificate. The details of this aspect will be described below with respect to FIG. 5.

Figure 4:
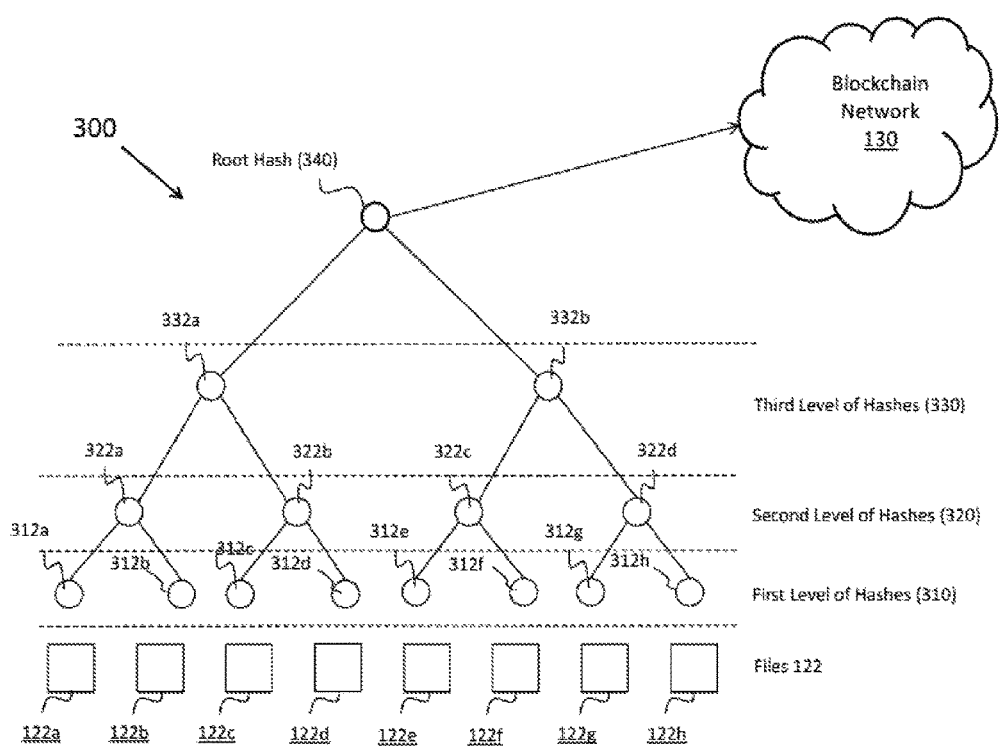
FIG. 4 illustrates a diagram of a hash tree illustrating the file authenticity method according to an exemplary aspect.

FIG. 4 illustrates a diagram of a hash tree 300 illustrating the file authenticity method according to an exemplary aspect. In general, the hash tree 300 or Merkle tree is a tree in which every non-leaf node is labelled with the hash of the labels or values (in case of leaves) of its child nodes. According to this aspect, hash trees allow efficient and secure verification of the contents of large data structures and are a generalization of hash lists and hash chains.

According to the exemplary aspect, it should be understood that the hash tree 300 illustrates the organizational structure of files 122 identified for authentication and the corresponding levels of hash values as computed by hash creation module 210. As shown, files 122a through 122h are identified/obtained by the computer 110 for the authentication algorithm. It is noted that the files identified/obtained by the computer 110 can be any plurality of files, for example, the files intended to be backed up and stored on a storage (e.g., local or cloud storage). Moreover, the files can be any set or portion of files which are archived or backed up periodically (e.g., any new or changed files on the computer/server, for example). Thus, it should be appreciated than any number of files can be identified and processed according to the exemplary aspect.

Once these files are obtained the hash creation module 210 generates a plurality of hash values 312a through 312h for each of the plurality of files 122a through 122h, respectively. It should be appreciated that the hash value of the data files 122a-122h can be calculated using known values with the resulting value having a fixed size. For example, the hash value of the data file can be calculated using the MD5 hashing algorithm, resulting in a 128-bit hash value, or using the SHA-1 hashing algorithm, resulting in a 160-bit hash value. It should be appreciated that the disclosure is not limited to these two common hashing algorithms according to alternative embodiments.

As shown in FIG. 4, these hash values 312a through 312h are considered to be part of a first level of hashes 310 according to the organizational structure. Next, the hash creation module 210 groups or divides the hash values 312a through 312h into a plurality of groupings (i.e., portions) with each grouping having at least two hash values. According to the exemplary aspect, the groupings are shown as four pairs: (i) pair 1: 312a and 312b; (ii) pair 2: 312c and 312d; (iii) pair 3: 312e and 312f; and (iv) pair 4: 312g and 312h. The pairings can be set arbitrarily, sequentially (in terms of timing for storage, or order of storage, or the like), for example. Moreover, according to an alternative aspect, each grouping can have more than two hash values.

After the hash creation module 210 groups the plurality of pairs of hash values, the hash creation module 210 is further configured to add the hash values together in each grouping to generate a hash sum. In turn, the hash creation module 210 further computes a hash value for each sum. As shown, this next level of hash values is shown as a second level of hashes 320 and includes hash values 322a, 322b, 322c and 322d. Again, the hash creation module 210 is configured to group/divide these hash values 322a, 322b, 322c and 322d into pairs, for example. According to the exemplary aspect, the groupings are shown as two pairs: (i) pair: 322a and 322b; and (ii) pair 2: 322c and 322d. Each of these pairs can be added as a hash sum and then the hash creation module 210 can compute a hash value based on the hash sums, similarly to the process described above. The resulting hash values 332a and 332b are shown in the third level of hashes 330. The process is continued until a root hash value 340 for the grouping of files 122a through 122h is created. As further shown and described above, the blockchain request module 220 is configured to transmit the root hash value 340 for the group of files 122 to the blockchain network 130 to be stored therein. Thus, according to the exemplary aspect, the computer 110 using the algorithm based on the hash tree 300 can concurrently obtain a confirmation of authenticity for a plurality of files 122, while limiting the process to a single transaction in the blockchain network 130.

As further described above, the authenticity of a file can be checked using a certificate of authority for the target file. Moreover, it is preferable that the certificate of authority management module 230 only stores information relating to a chain of hashes for the file in order to reduce the size of such a certificate.

Figure 5:
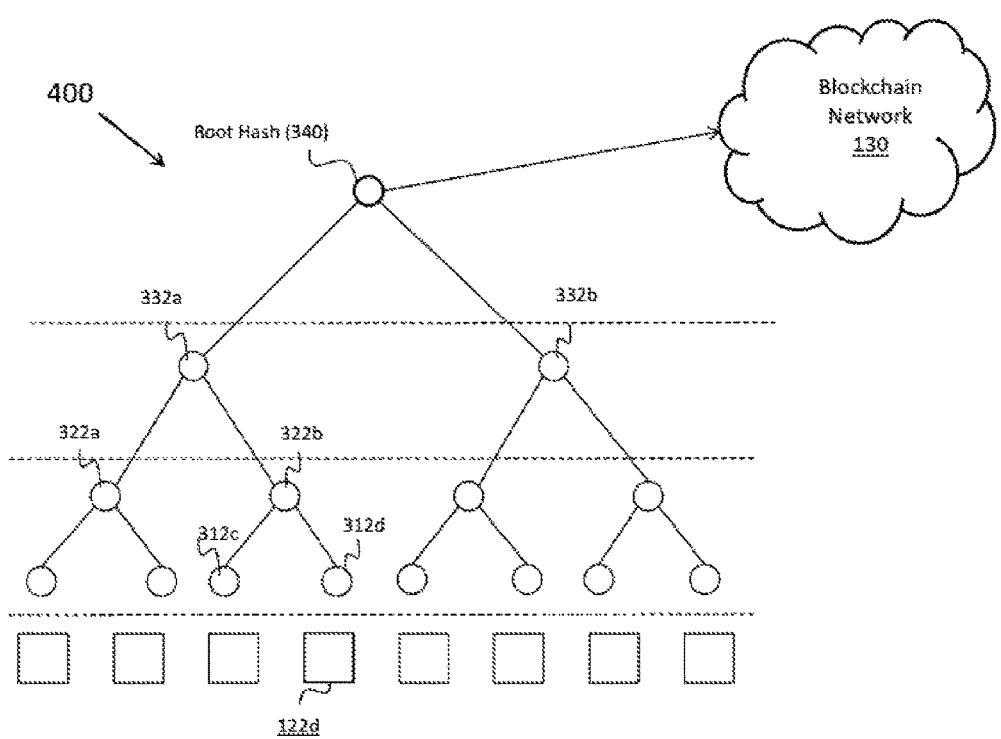
FIG. 5 illustrates a diagram of a hash tree illustrating a method for identifying the data required for a certification of authenticity for a target file according to an exemplary aspect.

FIG. 5 illustrates a diagram of a hash tree 400 illustrating a method for identifying the data required for a certification of authenticity for a target file according to an exemplary aspect. The target file is identified as the highlighted file 122d, which is provided as an example. Preferably for this file, only the information (i.e., the hash values) in the chain of hashes is stored in data storage 120, for example. Thus, following the chain up to the root hash 340, first the hash value 312d for file 122d is stored. Moreover, in this aspect, the "neighboring" hash in the first level of hashes (i.e., hash value 312c) that is paired with hash value 312d, as explained above, is also stored. Next, the paired hash value for hash value 322b is identified, which is based on which of the hashes of the next level is calculated. In this case, the next neighboring hash is 322a. Moving farther up the chain, hash values 332a and 332b are identified and stored before the root hash value 340 is identified also stored. Thus, for a certificate of authenticity for target file 122d, the certificate of authority management module 230 identifies each of hash values, 312d, 312c, 322b, 322a, 332a, 332b and 340 as the necessary and sufficient information that can be stored in data storage 120. Effectively, the computer 110 has reduced the size of the certificate for the target file 122d, since it has only used the required information for such certificate.

Moreover, according to another aspect, if the computer 110 determines that other files in the group of files 122 is no longer needed to be authenticated, the certificate of authority management module 230 can delete the related hash values that are not necessary for authentication of the target file 122d. For example, of files 122a through 122h, if the computer 110 determines, after a given time for example, that the only critical file for authentication is target file 122d, then the certificate of authority management module 230 can delete all of the non-highlighted hash values shown in FIG. 5, since these files are not required for the certificate of authenticity for file 122d.

Figure 6:
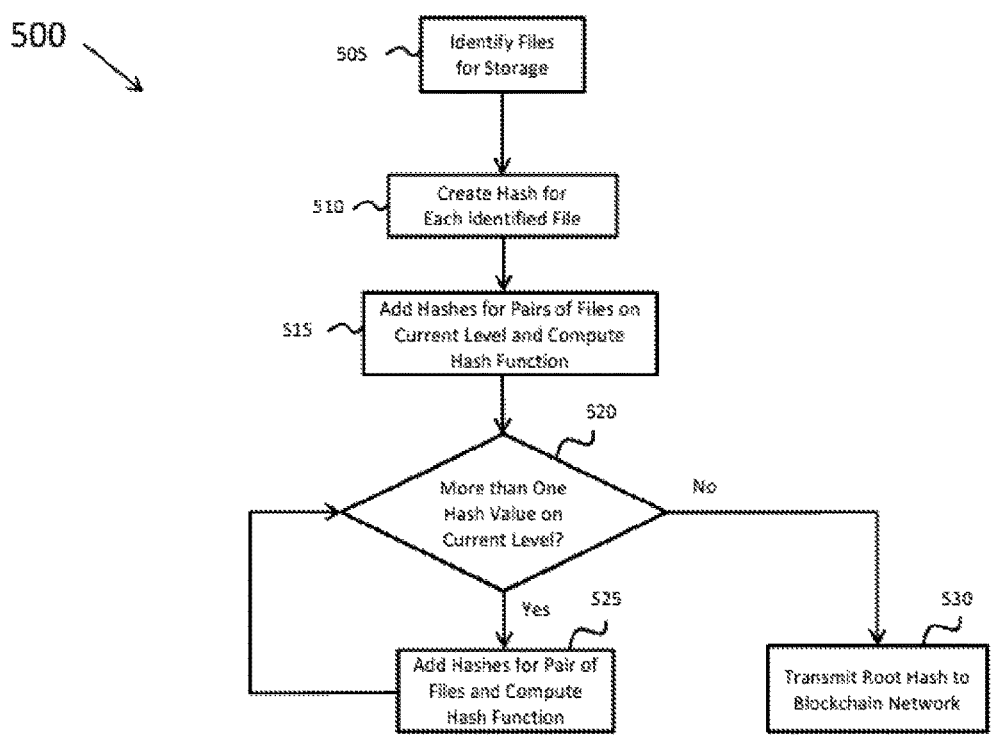
FIG. 6 illustrates a flowchart for a method for file authenticity certification using blockchain technology according to an exemplary aspect.

FIG. 6 illustrates a flowchart for a method 500 for file authenticity certification using blockchain technology according to an exemplary aspect. As shown, initially, at step 505, the computer 110, and, more particularly, data storage module 114, identifies a plurality of files from data storage 120 for the authentication process. Next, in step 510, the hash creation module 210 can create/compute a hash value for each identified file. For example, according to the exemplary aspect, the hash values for the data files can be calculated using the MD5 hashing algorithm, resulting in a 128-bit hash value, or using the SHA-1 hashing algorithm, resulting in a 160-bit hash value.

Furthermore, at step 515, the resulting hash values for each of the files is grouped together (for example in pairs) and a hash value for each grouping is calculated. At step 520, the hash creation module 210 determines whether the algorithm has reached the root level of the hash tree. In other words, the hash creation module 210 determines whether there is more than one hash value on the current level. If there is not, then the hash creation module 210 determines that the algorithm has reached the root level of the hash tree. The method then proceeds to step 530 where the blockchain request module 220 transmits the root hash value 340 for the group of files 122 to the blockchain network 130 to be stored therein. Alternatively, if there is more than one hash value on the current level as determined at step 520 (i.e., the answer is "YES"), then the method proceeds to step 525 where the hash creation module 210 groups two or more of the current hash values and computes a new hash function for each resulting sum. The method then returns to step 520. Steps 520 and 525 are continuously performed moving up the levels of the hash tree until the root level is reached at which point the method proceeds to step 530, as described above.

Figure 7:
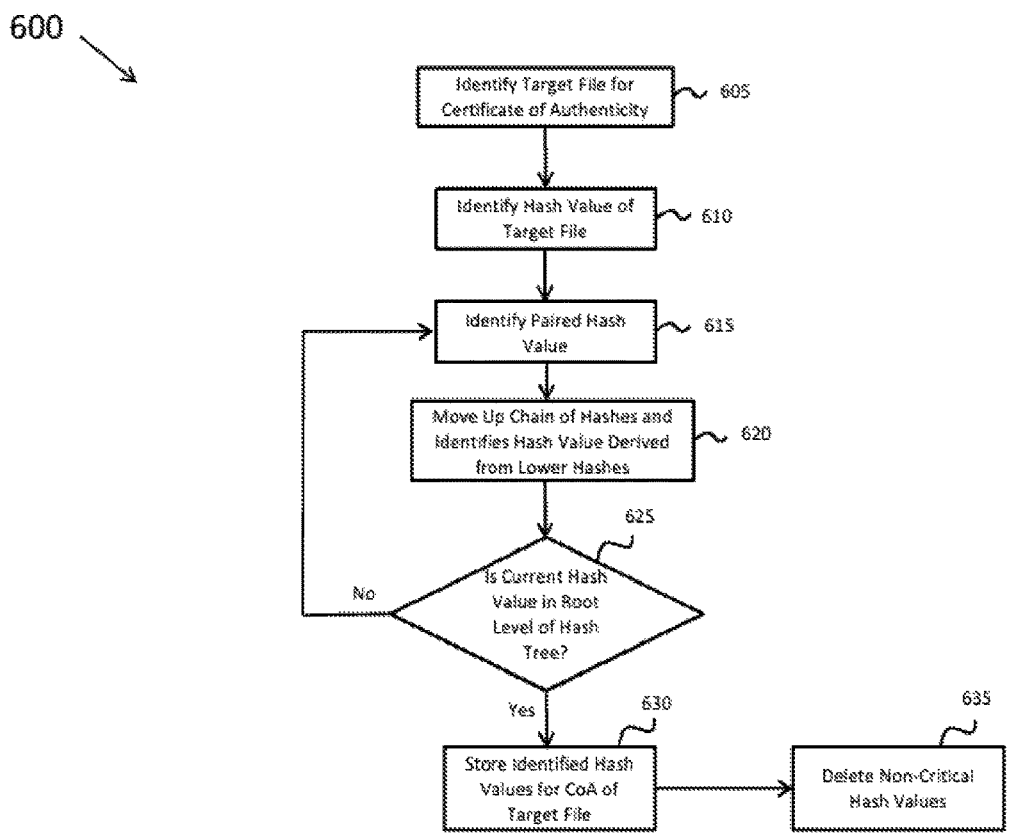
FIG. 7 illustrates a flowchart for a method for identifying the data required for a certification of authenticity for a target file according to an exemplary aspect.

FIG. 7 illustrates a flowchart for a method 600 for identifying the data required for a certification of authenticity for a target file according to an exemplary aspect. In general, it is contemplated that the certificate of authority management module 220 is configured to perform each of the steps according to an exemplary embodiment. Specifically, as shown, initially at step 605, module 220 identifies a target file for the certificate of authenticity. Next, at step 610, the module 220 identifies the corresponding hash value of the target file previously computed by hash creation module 210. Then, staying on the current level of the hash tree, module 220 further identifies the "neighboring" paired hash value. For example, referring back to FIG. 5, hash value 312c is the neighboring hash value of hash 312d for target file 122d. Once the paired hash value is identified at step 615, the method proceeds to step 620 where the module 220 continues up the hash tree to the next level and identifies the hash value derived from the pair of lower hash values. For example, hash value 322b is the derived hash value from hashes 312c and 312d.

Then, as further shown, at step 625 the method determines whether the currently identified hash value is on the root level of the hash tree. If not, the method proceeds returns to step 615 and identifies the paired hash value. Steps 615 through 625 are repeated as module 220 moves up the chain of hashes until it reaches the root level of the hash tree. At this point, the answer to step 625 is "YES" and the method proceeds to step 630 where all of the identified hash values along the chain of hashes are stored for the certificate of authentication of the target file. Finally, as an optional step, the method can proceed to step 635. Thus, according to the exemplary aspect, when a file is placed into storage, its hash value is saved into blockchain network as described herein. Moreover, according to an exemplary aspect, this information can be open and public (depending on the purposes of certain blockchain network—e.g., a public, corporate network), and, therefore, it cannot be changed or falsified. As a result, the disclosed system and method can verify the file any time, just by comparing of initial hash value with the current hash value. Moreover, in the exemplary aspect, the certificate of authority management module 230 can delete all of the non-critical hash values (e.g., the non-highlighted hash values shown in FIG. 5) since these files are not required for the certificate of authenticity for file 122d. As a result, the size of the data required for the certificate of authenticity has been reduced.

Figure 8:
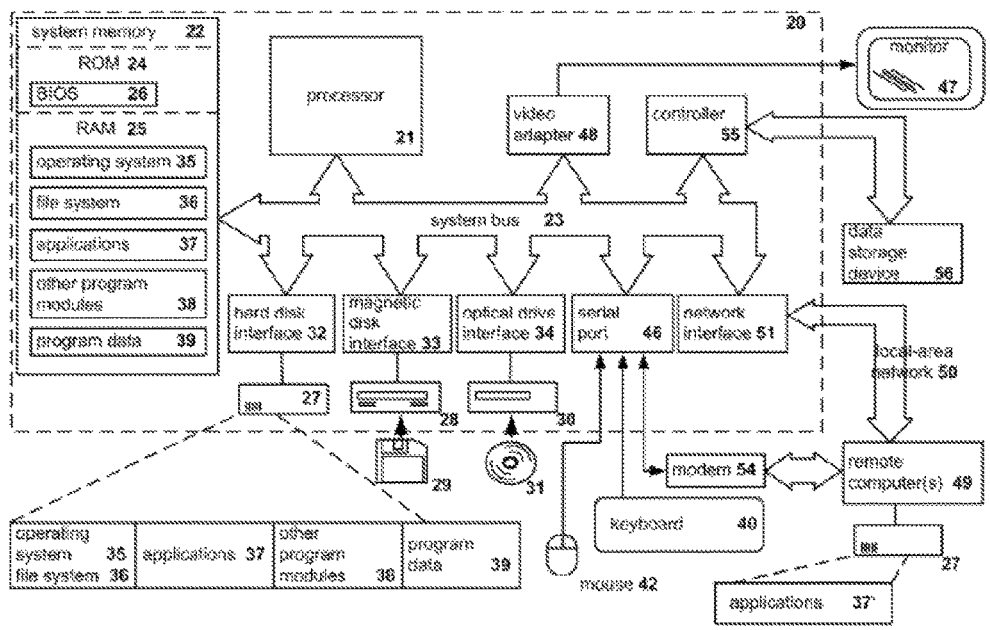
FIG. 8 illustrates an example of a general-purpose computer system on which the disclosed systems and method can be implemented.

FIG. 8 illustrates an example of a general-purpose computer system (which may be a personal computer or a server) on which the disclosed systems and method can be implemented according to an example aspect. It should be appreciated that the detailed general-purpose computer system can correspond to the computer 110 provided to implement the algorithms described above.

As shown, the computer system 20 includes a central processing unit 21, a system memory 22 and a system bus 23 connecting the various system components, including the memory associated with the central processing unit 21. The central processing unit 21 can correspond to the CPU 112 and the system memory 22 can correspond to memory 120 of FIGS. 2 and 3, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remove computer(s) 49 can correspond to the computer devices capable of managing transaction log 140, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for authenticating data files using a block chain network, the method comprising:
   identifying a plurality of data files in electronic data storage;
   creating, by a computer processor, respective first hash values for each of the plurality of files;
   adding, by the computer processor, a first plurality of the first hash values to create a first hash sum of the first plurality of the first hash values;
   creating, by the computer processor, a respective second hash value for the first hash sum;
   determining, by the computer processor, if there are any additional hash values corresponding to one file or a second plurality of the files that is not included in the first plurality of hash values;
   if the computer processor determines there are no additional hash values, determining the second hash value as the root value, and only transmitting the root value to the blockchain network in which at least one node in the blockchain network adds the root value as one or more blocks in a blockchain, wherein the transmitting constitutes a single transaction in the blockchain network; and
   generating a certificate of authenticity of each of the plurality of data files, the certificate of authority comprising, for each of the plurality of data files, those hash values in a chain of hash values that are identified as leading from the each of the plurality of data files to the root value.

2. The method according to claim 1, wherein, if the computer processor determines that there are additional hash values, the method further comprises:
   adding, by the computer processor, at least one plurality of the second hash values to create an additional hash sum of each of the at least one plurality of the second hash values;
   creating, by the computer processor, respective third hash values for each of the additional hash sums; and
   if there is only one third hash value, determining the third hash value as the root value and transmitting the root value to the blockchain network in which at least one node in the blockchain network adds the root value as one or more blocks in a blockchain.

3. The method according to claim 2, further comprising:
   continuously adding the hash sums and creating new hash values for the hash sums until the root hash value is computed; and
   transmitting only the root value to the blockchain network in which at least one node in the blockchain network adds the root hash value as one or more blocks in a blockchain.

4. The method according to claim 1, further comprising comparing the plurality of created hash values with the root hash value to authenticate at least one identified data file.

5. The method according to claim 4, further comprising deleting created hash values except for the identified plurality of created hash values required for the certificate of authenticity for the at least one identified data file.

6. The method according to claim 1, wherein the at least one plurality of first hash values is a pair of the first hash values.

7. A system for authenticating data files using a block chain network, the system comprising:

non-transitory electronic data storage that stores the data files; and a hardware processor, coupled to the electronic data storage, configured to:
identify a plurality of data files in electronic data storage;
create respective first hash values for each of the plurality of files;
add a first plurality of the first hash values to create a first hash sum of the first plurality of the first hash values;
create a respective second hash value for the first hash sum; determine if there are any additional hash values corresponding to one file or a second plurality of the files that is not included in the first plurality of hash values;
if there are no additional hash values, determine the second hash value as the root value, and only transmit the root value to the blockchain network in which at least one node in the blockchain network adds the root value as one or more blocks in a blockchain, wherein the transmitting constitutes a single transaction in the blockchain network; and
generate a certificate of authenticity of each of the plurality of data files, the certificate of authority comprising, for each of the plurality of data files, those hash values in a chain of hash values that are identified as leading from the each of the plurality of data files to the root value.

8. The system according to claim 7, wherein, wherein, if the hardware processor determines that there are additional hash values, the computer processor is further configured to:
add at least one plurality of the second hash values to create an additional hash sum of each of the at least one plurality of the second hash values;
create respective third hash values for each of the additional hash sums; and
if there is only one third hash value, determine the third hash value as the root value and transmit the root value to the blockchain network in which at least one node in the blockchain network adds the root value as one or more blocks in a blockchain.

9. The system according to claim 8, wherein the hardware processor is further configured to:
continuously add the hash sums and create new hash values for the hash sums until the root hash value is computed; and
transmit only the root value to the blockchain network in which at least one node in the blockchain network adds the root hash value as one or more blocks in a blockchain.

10. The system according to claim 7, wherein the hardware processor is further configured to compare the plurality of created hash values with the root hash value to authenticate at least one identified data file.

11. The system according to claim 10, wherein the hardware processor is further configured to delete the created hash values except for the identified plurality of created hash values required for the certificate of authenticity for the at least one identified data file.

12. The system according to claim 7, wherein the at least one plurality of first hash values is a pair of the first hash values.

13. A non-transitory computer readable medium storing computer executable instructions for authenticating data files using a block chain network, including instructions for:
identifying a plurality of data files in electronic data storage;
creating respective first hash values for each of the plurality of files;
adding a first plurality of the first hash values to create a first hash sum of the first plurality of the first hash values;
creating a respective second hash value for the first hash sum;
determining if there are any additional hash values corresponding to one file or a second plurality of the files that is not included in the first plurality of hash values;
if there are no additional hash values, determining the second hash value as the root value, and only transmitting the root value to the blockchain network in which at least one node in the blockchain network adds the root value as one or more blocks in a blockchain, wherein the transmitting constitutes a single transaction in the blockchain network; and
generating a certificate of authenticity of each of the plurality of data files, the certificate of authority comprising, for each of the plurality of data files, those hash values in a chain of hash values that are identified as leading from the each of the plurality of data files to the root value.

14. The non-transitory computer readable medium according to claim 13, wherein, if there are additional hash values, instructions are further includes for:
adding at least one plurality of the second hash values to create an additional hash sum of each of the at least one plurality of the second hash values;
creating respective third hash values for each of the additional hash sums; and
if there is only one third hash value, determining the third hash value as the root value and transmitting the root value to the blockchain network in which at least one node in the blockchain network adds the root value as one or more blocks in a blockchain.

15. The non-transitory computer readable medium according to claim 14, further including instructions for:
continuously adding the hash sums and creating new hash values for the hash sums until the root hash value is computed; and
transmitting only the root value to the blockchain network in which at least one node in the blockchain network adds the root hash value as one or more blocks in a blockchain.

16. The non-transitory computer readable medium according to claim 13, further including instructions for comparing the plurality of created hash values with the root hash value to authenticate the at least one identified data file.

17. The non-transitory computer readable medium according to claim 16, further including instructions for deleting created hash values except for the identified plurality of created hash values required for the certificate of authenticity for the at least one identified data file.

* * * * *